JAMES L. CATHCART.

Self Releasing Hook.

No. 123,236.              Patented Jan. 30, 1872.

WITNESSES.

INVENTOR.

123,236

UNITED STATES PATENT OFFICE.

JAMES L. CATHCART, OF WASHINGTON, DISTRICT OF COLUMBIA.

IMPROVEMENT IN SELF-RELEASING HOOKS.

Specification forming part of Letters Patent No. 123,236, dated January 30, 1872.

Specification of certain Improvements in Self-Detaching Hooks, invented by JAMES L. CATHCART, of Washington, in the District of Columbia.

The subject of this invention is a hook, so constructed that it will securely hold any suspended burden so long as the weight rests upon it, but will automatically release and become detached from the same as soon as relieved of its weight.

To this end, I make the hook with a pivoted nose or point, with an arm extending over the bend of the hook in such position that the ring or other object will rest upon it, the parts being so formed and applied that when the hook is relieved of its burden the preponderance in weight of that part of the point which projects beyond the pivot will cause the point to fall and throw the ring out of the hook. To assist this action a spring may be applied underneath the arm on which the ring rests; but this is not deemed essential to the invention.

The hook may also be provided with a mousing, which can be used when it is desired that the hook shall not be automatically detached.

Figure 1:
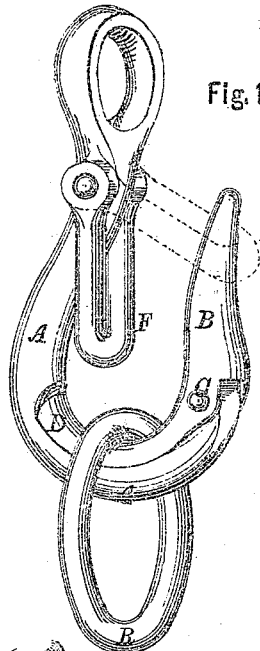
Figure 2:
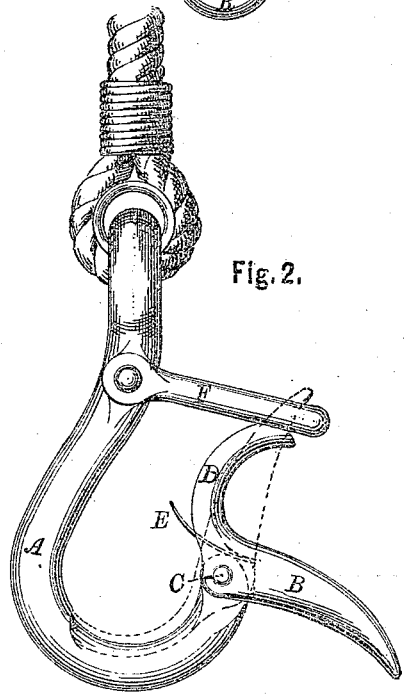

In the drawing, Figure 1 is a perspective view of my improved hook with a ring upon it, showing the position of the parts, supposing a burden to be suspended from the said ring. Dotted lines show the mousing in position, but full lines show it hanging loosely, leaving the hook in condition to become automatically released when the burden comes to rest. Fig. 2 is a side elevation, showing the position of the point when the ring is discharged. Dotted lines in this figure indicate the previous position of the point, representing more clearly the projection of the chief part thereof beyond the pivot.

A is the main body of the hook, and B the movable point thereof, which is pivoted at C, and has formed in one piece with it an arm, D, which fits over the concavity of the hook, as shown in Fig. 1, in position for a ring, R, or other object to rest upon it, and, by the weight of the burden thereto attached, to retain the point B in an upright position, compressing the spring E, if such spring be used. F represents a mousing, of common form, which may be thrown over the point of the hook, if desired.

The parts being in the position shown in full lines in Fig. 1, it will be apparent that any burden suspended from the hook will be held with perfect security; but as soon as the said burden reaches a resting place the arm D, being relieved of any weight beyond that of the ring, will allow the point B to fall by its own gravity and throw off the ring.

My invention thus constitutes a simple and effective device for detaching boats from vessels, and detaching any object from a block-hook or any hook in the act of lowering. My invention also affords great facility in hooking. This will be apparent from an inspection of Fig. 2 of the drawing, which shows the horizontal position of the point of the hook in readiness to insert in a ring or other object, which can be done with much greater ease than in the case of a hook with a vertical point. My invention also forms an excellent hook for butchers, and various other uses which it is not necessary to particularize.

It will be observed that no strain whatever comes upon the pivot C, but the burden is sustained as securely as in any hook of common form.

I claim as my invention—

The hook A, point B, and arm D, constructed and combined, as herein described, so that the preponderance in weight of the said point beyond its pivot will cause said point to fall and release the hook when relieved of the weight of the burden.

JAMES L. CATHCART.

Witnesses:
  OCTAVIUS KNIGHT,
  WM. H. BRERETON, Jr.